United States Patent [19]

Super et al.

[11] Patent Number: 5,209,972
[45] Date of Patent: May 11, 1993

[54] MULTIPLE LAYER PACKAGING FILM

[76] Inventors: Scott S. Super, 2612 Wessex Rd., Winston-Salem, N.C. 27106; Jerry F. Jesse, 237 Alcott Dr.; Joseph C. Hsu, 1116 Oxford Ct., both of Neenah, Wis. 54956

[21] Appl. No.: 266,716

[22] Filed: Nov. 3, 1988

Related U.S. Application Data

[63] Continuation of Ser. No. 491,350, May 4, 1983, abandoned.

[51] Int. Cl.$^5$ .............................................. B32B 7/12
[52] U.S. Cl. .................... 428/349; 428/458; 428/483; 428/516; 428/520; 428/522
[58] Field of Search ............... 428/520, 516, 458, 910, 428/347, 354, 910, 355, 480, 483, 522

[56] References Cited

U.S. PATENT DOCUMENTS

| | | | |
|---|---|---|---|
| 3,503,786 | 3/1970 | Barbehenn et al. | 428/349 |
| 3,600,267 | 8/1971 | McFedries et al. | 428/349 |
| 3,741,253 | 6/1973 | Brax et al. | 138/137 |
| 3,775,239 | 11/1973 | Snow | 428/349 |
| 4,064,296 | 12/1977 | Bornstein | 428/35 |
| 4,095,012 | 6/1978 | Schirmer | 428/474 |
| 4,188,443 | 2/1980 | Mueller | 428/216 |
| 4,194,039 | 3/1980 | Mueller | 428/213 |
| 4,261,473 | 4/1981 | Yamada | 215/1 C |
| 4,352,702 | 10/1982 | Bornstein | 156/84 |
| 4,352,844 | 10/1982 | Bornstein | 428/35 |
| 4,379,117 | 4/1983 | Baird et al. | 264/514 |
| 4,389,450 | 7/1983 | Schaefer et al. | 428/347 |
| 4,391,862 | 7/1983 | Bornstein et al. | 428/35 |
| 4,397,916 | 8/1983 | Nagano | 428/35 |
| 4,456,646 | 6/1984 | Nishimoto et al. | 428/216 |
| 4,457,960 | 7/1984 | Newsome | 428/35 |
| 4,469,742 | 9/1984 | Oberle | 428/215 |
| 4,472,227 | 9/1984 | Toyoda et al. | 156/244 |
| 4,501,797 | 2/1985 | Super et al. | 428/349 |
| 4,501,798 | 2/1985 | Koschak et al. | 428/349 |

FOREIGN PATENT DOCUMENTS

| | | |
|---|---|---|
| 1769510 | 7/1971 | Fed. Rep. of Germany . |
| 2029762 | 3/1980 | United Kingdom . |
| 2099754 | 12/1982 | United Kingdom . |
| 2048903 | 3/1983 | United Kingdom . |
| 2103999 | 3/1983 | United Kingdom . |

*Primary Examiner*—Edith Buffalow

[57] ABSTRACT

A multiple layer packaging film is based on three layers and wherein polyethylene terephthalate is one of the layers. All three layers are oriented. The three layers may be used as a stand-alone film, or may be combined with other layers to achieve additional beneficial properties. Desirably, the polyethylene terephthalate may be metallized, then laminated to a reverse printed layer of oriented polypropylene or polyester.

18 Claims, 2 Drawing Sheets

MULTIPLE LAYER PACKAGING FILM

CROSS-REFERENCE TO RELATED APPLICATION

This application is a continuation of prior application Ser. No. 06/491,350, filed May 4, 1983, now abandoned.

BACKGROUND OF THE INVENTION

In the packaging of certain products, and in particular food products, it is highly desirable to impede, and where economically practical, to prevent the transmission of certain gaseous materials into or out of the closed package. While not all gaseous permeations are harmful, the products of concern are caused to deteriorate in quality, and usually in use life, when exposed to certain ones of the various gases normally present in the air.

Addressing food products in particular as representative of the problem addressed herein, certain of the food products are harmed, either aesthetically, or chemically by transmissions especially of oxygen, water vapor, and the like. A typical problem is encountered in snack packaging. Many dry foods such as snacks are advertised and marketed as having certain properties of crispness and freshness. For consumer satisfaction, it is important that these properties be retained through the intended use life. Crispness is usually controlled by control of the moisture level. Freshness is usually associated with both crispness and flavor. Particularly the flavor property is attributed to oxygenation-type reactions with the product. Specifically oxidation of cooking oils, such as in snack chips, produces a change in flavor usually described as rancid. Thus, in this product area, it is significant to control oxygen and water vapor transmission into the package.

Since most packages of the type contemplated herein are formed by activating heat seals, films commonly used have a heat sealable layer on one surface of the film and a more heat resistant layer on the other surface of the film, the two surface layers may be joined directly, or they may have intervening layers to provide interlayer adhesion, barrier properties and the like. It is known to use biaxially oriented polypropylene or biaxially oriented polyesters as the heat resistant layer. The composition of the heat seal layers may be selected from among the commonly known materials, mainly polyethylenes, ethylene copolymers and derivatives thereof. There have also been known uses of saran and certain grades of polypropylene as the sealant layer. Saran is commonly incorporated into the structure as an oxygen barrier layer and may also serve as the heat seal layer in some cases. The polyolefins, and particularly polyethylene provide a certain degree of protection against infusion of moisture vapor.

Recent improvements in barrier layer provisions have resulted from the use of a layer of metal in the film structure. One form of use of metal is known as metallized, wherein a thin layer of metal is vapor deposited onto a polymeric film substrate. While the metallized layer is very thin, it can serve as an effective barrier to transmission of all gases when applied to an appropriate substrate. Metallization also provides an aesthetically pleasing appearance. In presently used metallized structures, the metallization is deposited onto a substrate of either biaxially oriented polyethylene terephthalate (PET) or biaxially oriented polypropylene (OPP). In one known structure the opposite surface of the PET is coated with saran to provide a heat seal layer. In another known structure, a film of PET and PETG (glycol modified polyethylene terephthalate) is metallized on the surface of the oriented PET layer. In that structure the PETG serves as the sealant layer. In both of the above structures, the metallized surface (and sometimes intervening layers) is then laminated to an abuse resistant layer such as OPP or oriented PET.

While the described structures provide good protection, they both have inherently costly features. In the first structure, an additional processing step is required to apply the saran heat seal layer coating. In the second structure, the temperature of heat sealing PETG is higher than desired, giving a narrow heat seal range and making the formed packages susceptible to distortion when heat sealed, and requiring excessive energy usage by the packager.

In the above structures, the salient desirable features are provided by the metallization and the oriented PET. The metallization provides good barrier against gaseous permeation. Typical oxygen permeation rate is no more than about 0.06 cm.$^3$/100 in.$^2$ 24 hrs, at 73° F., 0% R.H. Typical water vapor transmission rate is no more than 0.05 cm.$^3$/100 in.$^2$ 24 hrs., at 100° F., 90% R.H. The oriented PET provides an excellent, smooth and uniform surface for deposition of the metallizing layer, providing for a uniform coverage and bonding of the metal, and thus uniform barrier protection. The oriented PET also imparts a crisp, crinkly feel to the film such as has been found aesthetically pleasing to consumers. The advantages are achieved, however, at an increased cost, either in making the film or in using it, as iterated above. It would be desirable to achieve the same functional film performance while reducing the cost. To wit, the metallized oriented PET should somehow be incorporated into a film which has improved economics.

Various attempts have been made to advantageously utilize the benefits of molecular orientation of films to achieve certain of the desirable properties. Attempts at simultaneously orienting a plurality of layers in a multiple layer film have met with limited success. A problem encountered in these developments has been that each different polymer has its unique set of rheological properties related to the heating and stretching conditions. Especially where certain layers in a multiple layer structure respond to orientation processes by accepting differing amounts of orientation rearrangement at the molecular level, by virtue of differing responses to the temperature present during the orientation process, additional provisions are desirably made to facilitate effecting the simultaneous orientation of the plurality of layers. Absent these provisions, in previous attempts to orient multiple layer films, adjacent layers have tended to develop undesirable stresses at layer interfaces, and cohesive stresses within the layers themselves. These stresses too often have manifested themselves in poor interlayer adhesion at the layer interfaces, and in cracking or hole development in one or more of the layers.

Mueller U.S. Pat. No. 4,188,443 handles this problem in a 5 layer film by selecting the compositions of the second and fourth layers, and an appropriate processing temperature, such that the second and fourth layers are above their melt temperatures during the orientation process (col. 5 line 43). While this mechanism is successful in relieving the interfacial stresses of the orientation process, only 3 of the 5 layers may be truly molecularly oriented. And selection of material compositions for layers 2 and 4 is limited by the melting temperature requirements. There is no teaching wherein adjacent layers are oriented.

Yamada U.S. Pat. No. 4,261,473 teaches a balanced 3 layer film, as in his EXAMPLE 10, wherein the outer layers are polyethylene terephthalate and the core layer is EVOH. Sheets of this film are preheated for a lengthy 5 minutes, apparently to reach steady state temperature throughout the film thickness, before the film is stretched by drawing it into a "cup" shaped mold. This process is more closely related to conventional thermoforming than to molecular orientation.

Mueller U.S. Pat. No. 4,194,039 teaches a "balanced" 3 layer film (col. 6 line 23) that is a combination of olefins and olefin blends. The film is made by a plurality of extrusion steps and orientation steps. The core layer is "hot stretched" as distinguished from the skin layers which are "biaxially oriented" (Col. 8 lines 53-59).

Bornstein U.S. Pat. No. 4,064,296 teaches an oriented 3 layer film having EVOH as the core layer. However, in Bornstein's film it is "crucial" (col. 4 line 65) that one of the two outer layers be cross-linked i.e. by irradiation.

In U.S. Pat. No. 4,501,797 filed Dec. 1, 1982, and of common assignment herewith, there are disclosed four and five layer unbalanced oriented films. The films disclosed therein all have polypropylene as one surface layer.

U.S. Pat. No. 4,501,798 of common assignment herewith discloses seven layer unbalanced oriented films, which include the substructure /Nylon/EVOH/Nylon/.

It is an object of this invention to provide an economical packaging film having adjacent layers which have been simultaneously molecularly oriented, and wherein one of the simultaneously molecularly oriented layers is polyethylene terephthalate. It is a further object to provide such a film with a sealant layer having a low-to-moderate heat sealing temperature. It is still another object to metallize the uniaxially oriented PET layer surface and laminate an abuse resistant oriented polypropylene layer to the metallized PET layer. Such a film is economical to make, with minimum processing steps. It provides excellent barrier to gaseous transmission, and the metallization provides an aesthetically pleasing appearance. The oriented polypropylene layer may be conventionally reverse printed with desired graphics.

SUMMARY OF THE INVENTION

It has been found that these and other objectives are achieved in a molecularly oriented three layer film, the first layer being heat sealable, the second layer comprising a modified polyolefin or olefin copolymer, and the third layer being polyethylene terephthalate. The invention is advantageously embodied in a film which has been produced by simultaneously coextruding the first, second and third layers and subsequently simultaneously orienting all three layers, and finally heat setting, also known as annealing, the oriented film. The composition of the heat sealant layer is preferably chosen from the group consisting of low density polyethylene, ethylene methyl acrylate, ethylene vinyl acetate and ionomer. Most preferably, the sealant layer composition is ionomer. The preferred composition for the adhesive layer is a modified ethylene copolymer.

In another, and preferred, embodiment of the invention, the third layer is metallized and is finally laminated by a polyethylene adhesive layer to an abuse resistant layer, such as oriented polypropylene, oriented polyester, or oriented nylon. Advantageously, the abuse resistant layer may be reverse printed before lamination so that the printing is protected from environmental abuse by the abuse resistant layer.

In yet another, but less preferred embodiment of the invention, the abuse resistant layer is oriented polyester, and the metallizing is placed on the abuse resistant layer rather than on the third layer of molecularly oriented polyethylene terephthalate, and is buried in the final film structure. In this embodiment any printed indicia or other graphics are surface printed on the abuse resistant layer.

The invention includes a novel method of making the films herein described. The first heat sealable layer, the second adhesive layer, and the third polyethylene terephthalate layer are first coextruded as a three layer film. The film is then molecularly oriented and heat set. The film is entirely satisfactory for some uses in this form.

In making the preferred films of this invention, the abuse resistant layer is added by lamination after metallizing of either the third polyethylene terephthalate layer or the abuse resistant layer, and optional reverse printing of the abuse resistant layer.

In its final, and ultimate form, the invention is embodied in a bag, or pouch, made by folding the film such that portions of the heat sealable layer are in face to face contact, and forming heat seals about the periphery of a portion thereof. Desired product is, of course, introduced into the bag before the last portion of the seal is made to close the bag.

DETAILED DESCRIPTION OF THE ILLUSTRATED EMBODIMENTS

Figure 1:
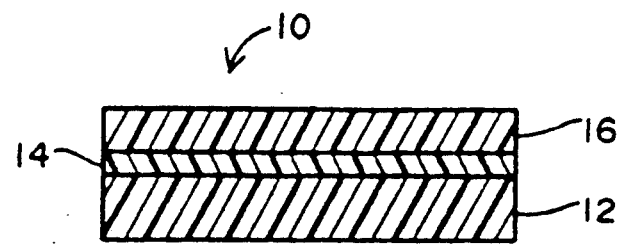
FIG. 1 is a cross-section of the simplest embodiment of the films of this invention.

Turning now to the invention in detail, the simplest form of the article of the invention is shown in FIG. 1 and is designated by the numeral 10. In the cross-section of film shown by FIG. 1, layer 12 is a heat sealable layer. Layer 14 is a polymeric adhesive layer. Layer 16 is polyethylene terephthalate. In the inventive form of the film structure, as shown, all three layers are uniaxially oriented, layers 12, 14, and 16 being bonded to each other at their respective layer interfaces without the use of intervening adhesives, as seen in FIG. 1.

Figure 2:
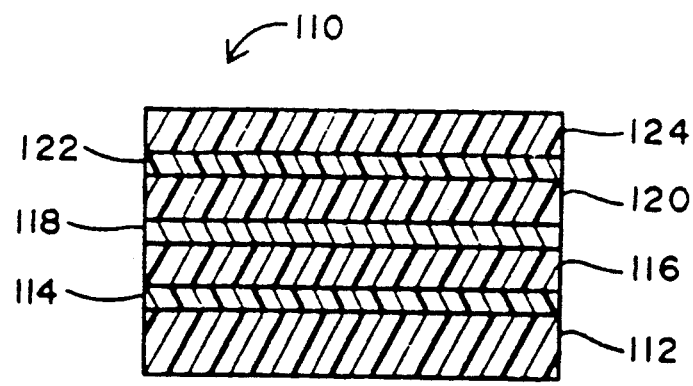
FIG. 2 is a cross-section of another more protective, and preferred embodiment of the films of this invention.

FIG. 2 is generally designated by the numeral 110 and represents the preferred embodiment of the film structure of the invention, as will be seen hereinafter. In FIG. 2, the numbering pattern is the same as for the respective layers in FIG. 1, except that 100-series numbers are used to distinguish the figure being discussed. For example, layer 112 in FIG. 2 is the heat sealable layer in the FIG. 2 structure, just as layer 12 is the heat sealable layer in FIG. 1. Layer 114 is an adhesive polymer layer. Layer 116 is polyethylene terephthalate. All of layers 112, 114, and 116 are uniaxially oriented. Layer 118 is a thin layer of metallization, preferably aluminum, as is commonly now used in the flexible film industry. Layer 120 is a polyethylene adhesive laminate layer. Layer 122 is ink, printed as desired for indicia and appearance sake on layer 124. The ink usually does not cover the entire surface area of the film, and as such has interruptions therein which allow for intimate contact between layer 120 and layer 124.

Figure 3:
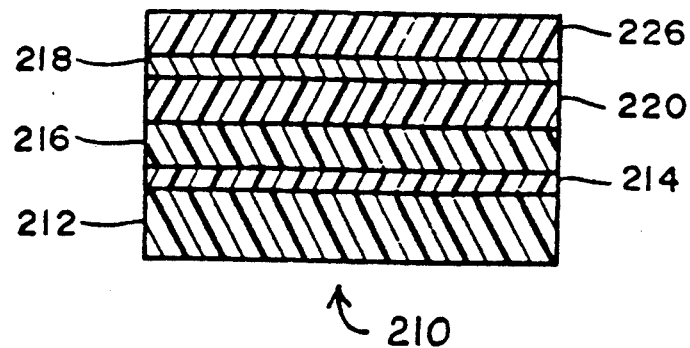
FIG. 3 is a cross-section of an alternate embodiment of the more protective films of this invention.

The structure shown in FIG. 3 is similar to the structure of FIG. 2 in many respects, although it is less preferred. Layers 212, 214, and 216 correspond respectively to layers 112, 114, and 116 of FIG. 2, including all three layers being uniaxially oriented. Turning now to the difference between FIGS. 2 and 3, it is seen that the metallization layer 118 is applied to buried oriented PET layer 116 in FIG. 2 while the metallization layer 218 is applied to the reverse side of outer oriented polyethylene terephthalate layer 226 in FIG. 3. This rearrangement in FIG. 3 provides for direct adhesive contact between layers 216 and 220. The reason the FIG. 3 structure is less preferred is because, with the metalization 218 applied to layer 226, any graphics or other ink indicia are applied (not shown) on the exposed surface of layer 226. A further concern regarding the FIG. 3 structure is that the outer abuse resistant layer 226 is oriented PET which is more costly than the OPP commonly used in layer 124 of FIG. 2. The reason layer 226 is oriented PET is to provide a satisfactory surface for obtaining a uniform application of the barrier metallization layer 218 whereby the excellent barrier benefits of the metallization may be obtained as discussed more fully hereinafter. OPP does not provide such a satisfactory surface, whereby the excellent barrier properties of the metallization layer would not be obtained.

The crucial part of this invention which is common to all the embodiments is in the 3 layers 12, 14, and 16, and their counterparts in FIGS. 2 and 3, which, in each embodiment of the invention, are produced as a coextruded three layer film and are subsequently simultaneously oriented. In a typical operation of producing the three layer film, the three polymers selected are extruded through three separate extruders in known manner, and the melt streams are joined in a three layer die and exit the die as a three layer film. The film is then cooled to solidify it. The preferred process is cast coextrusion. The film may then be wound up on a roll and stored for further processing at a convenient time. When convenient, the three layer film is then oriented such as on an equipment line outlined in FIG. 4. Alternatively, the three layer film may be oriented in line with the extrusion operation, saving at least one material handling operation. After the three-layer film has been oriented, it has a structure as seen in FIG. 1 and may be used as is, in applications which do not require a good barrier to vapor transmissions through the film. As indicated hereinabove, the most preferred films of this invention are further structured particularly as in FIG. 2. The concept of the oriented three layer structure accomplishes two important objectives. The first objective is to create an oriented PET surface which is an excellent surface for deposition thereon of a uniform layer of metallization which will act as an effective barrier to gaseous transmission through the film. The second objective is to provide, in an economical manner, a heat sealable layer, having good heat seal characteristics, attached to the oriented PET, which heat sealable layer can be activated at a relatively low processing temperature to provide energy economics to the packager.

Returning now to the structure of FIG. 2, it is seen that oriented PET layer 116 is metallized for the primary purpose of obtaining a gaseous barrier and a secondary benefit of adding aesthetic appeal to the package appearance. A previously formed layer 124 of OPP may be printed with any desired graphics and is then laminated, preferably extrusion laminated as at 120 in FIG. 2, in known manner to the metallized (118) PET layer 116. OPP layer 124 provides physical protection for the metallization barrier layer 118. In the FIG. 2 structure the OPP layer can, as illustrated, also serve as the carrier of any desired ink indicia or graphics; and does impede the rate of water vapor transmission.

In the FIG. 3 structure, the positioning of the metallizing layer 218 puts two further constraints on the structure. The first constraint is that the abuse resistant layer 226 should be oriented PET, rather than OPP, in order to provide a satisfactory metallizing surface. The second constraint is that, in order to be visible on the package, any ink would have to be between the metallized layer 218 and the package exterior. Since techniques for metallizing over ink are difficult at best, ink preferably is not reverse printed on PET layer 226 and subsequently metallized. Therefore the most likely use of ink is as surface printing on the outside surface of layer 226.

Depending on the end use contemplated, the outer abuse resistant layer as in FIGS. 2 and 3 may be oriented polypropylene, oriented polyester, or oriented nylon.

While the compositions of the several layers are relatively fixed as described, the compositions of the sealant layer and the adjacent adhesive layer may vary somewhat. Selection of the composition of the adhesive layer depends primarily on the ability of the bonds at the layer interfaces, namely interfaces 12/14 and 14/16, to survive intact and with good bond strength the coextrusion and orienting processes. Functionally, the most critical polymer selection is the composition of the adhesive layer, as at 14 in FIG. 1, because of the difficulty of finding an adhesive polymer whose adhesion to PET will survive both the coextrusion and orientation processes. The inventors have so far found three adhesive polymers which satisfy this requirement: CXA E-136 and CXA-3101, both by DuPont which are believed to be modified olefin copolymers, and LF-500, by Mitsui Company, which is a carboxy-modified polyethylene.

Given the adhesive which will adhere well to the PET layer, one is then able to select suitable polymers for the heat seal layer. Preferred polymer compositions are low density polyethylene, ethylene methyl acrylate, ethylene vinyl acetate and ionomer. The most preferred combination is CXA E-136 as the adhesive polymer and ionomer as the heat seal layer.

Figure 4:
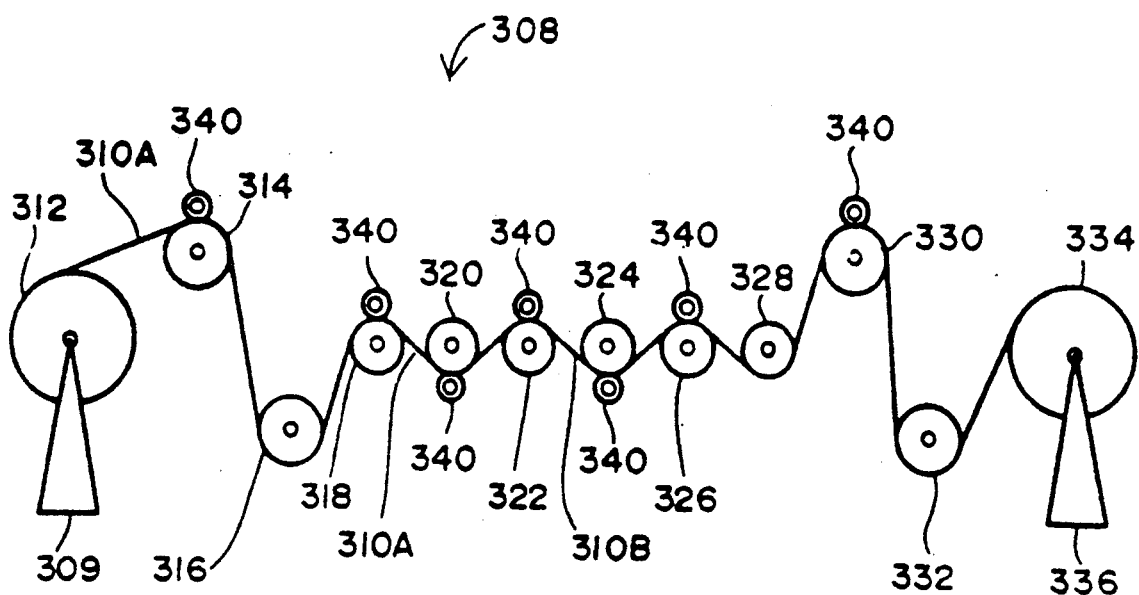
FIG. 4 is an outline of a representative line of processing equipment for carrying out the orientation of films of this invention.

In understanding the process, as in FIG. 4, of uniaxially orienting the three layer film comprising layers 12, 14, and 16, it is significant to understand that the composition of sealant layer 12 responds to thermal stimuli at a substantially lower temperature than other layers of the film, and particularly layer 16. Significantly, the inventors have found that by selectively applying heat to each surface separately, and at a temperature selected to be compatible with the response of that surface layer to thermal stimuli, and the response of the interior layer, and thus the orientation of the composition of those two layers, and by applying that heat to each surface for a moderate period of time, the three layer film herein may be successfully oriented without incurring splitting, pin-holing, or softening, or any one layer.

The selection of the best orientation ratio for any given film is dependent upon the specific polymers chosen for each of the three layers, and the interlayer adhesion levels required by the intended end use of the film. For most packaging applications, interlayer adhesion levels should be at least 70 grams per inch width as measured by ASTM D903. For films contemplated by this invention, the preferred orientation ratio is usually 3/1, although some deviation is possible without serious interference with adhesion levels; and a range of 2.5/1 to 4/1 is acceptable.

In the illustrative process described herein, the heat applied to each of the surface layers, e.g. layers 12 and 16, is applied to the surface layers as they alternate contacting alternative ones of the temperature-controlled rolls.

As an illustration, consider the processing through the equipment of FIG. 4 of a typical previously coextruded three layer film as in FIG. 1, wherein layer 12 is ionomer, layer 14 is CXA E-136 and layer 16 is PET. The film 310A is unwound from a roll 312 on unwind station 309 at a speed of 90 feet per minute with the PET layer on the bottom surface of the film such that the PET contacts turning roll 314, which is kept at room temperature, or about 20° C. The film then progresses to the first pre-heat roll 316 which is temperature controlled at a temperature of 70° C., and where layer 12 is against roll 316 and receives initial pre-heating. At the next roll 318, which is temperature controlled at 91° C., the PET layer receives its initial direct-contact pre-heating. layer 12 receives additional pre-heating at roll 320 which is temperature controlled at 70° C. With one surface of the film (at layer 12) heated to about 70° C., and the other surface (at layer 16) being heated to about 91° C., and the surface temperatures thus differing by about 21° C., a temperature gradient thus exists across the thickness of the cross-section of the film. The film is thus under the influence of this temperature gradient while it is then stretched between rolls 320 and 322, the feed rate at roll 320 being about 90 feet per minute, as controlled by the unwinding at roll 312.

This stretching is accomplished by driving roll 322 faster than roll 320 and controlling the difference in drive speeds to effect the desired amount of stretch, referred to herein as the orientation ratio—that being the fractional ratio of the driving speeds of the rolls 320 and 322. In this illustration, then, typical machine speeds during and after stretching are on the order of 270 feet per minute. It is anticipated that higher line speeds may be achievable.

After the film is stretched between rolls 320 and 322 it is designated 310B, as shown between rolls 322 and 324. Roll 324 is again temperature controlled; in this illustration at 70° C., the same as roll 320. Roll 322 is temperature controlled at 91° C., the same as roll 318. Rolls 326 and 328 are controlled at 80° C. The film is then annealed to provide a heat set to the film by contacting annealing roll 330, which roll is temperature controlled at 125° C. After annealing, the film is cooled by chill roll 332 to less than 40° C. and is subsequently would up on a roll 334 at wind up station 336.

In terms of heating contact time, the film is in contact with pre-heat roll 316 for about 1.2-2.7 seconds, and rolls 318 and 320 for about 0.6-2.1 seconds each. Contact time on rolls 322, 324, 326 and 328 is about 0.4 to 0.6 second each. Contact time on rolls 330 and 332 is about 0.5 second. Also significant to the process is good control of the film speed and contact on all rolls at all stages of the operation. Thus nip rolls 340 are used at several locations along the processing line as seen in FIG. 4.

Rolls 326 and 328 are optional in the processing line. When used, they are typically held at about 80° C., the preferred functional nature of rolls 326 and 328 being such that they are held at the maximum temperature possible without having the sealant layer stick.

The process is adaptable to orienting the films of the invention whether the PET layer is on the top of the film or the bottom of the film. For example, the same film as above illustrated may be processed with the PET layer on the top of the film provided that the roll temperature are appropriately adjusted to compensate for the relative sensitivity of the surface layers.

The corresponding roll temperatures are shown in the following Table 1 wherein the foregoing illustrated film is shown as Example 1. The same film oriented with the PET on top of the film is shown as Example 2. A third film of structure PET/CXA/LDPE, oriented with the PET on the bottom surface of the film is shown as Example 3. In designing a particular orienting operation, the rolls contacting the sealant layer are held at as high a temperature as is possible without the sealant layer sticking to either the temperature controlled roll or one of the nip rolls 340. Also, for example, heat transferred through the film during annealing may heat the rubber nip roll to a point where the sealant layer is softened and begins to stick to the rubber roll, if the annealing roll temperature is too high.

TABLE 1

| Roll | Roll Temp. °C. | | |
|---|---|---|---|
| No. | Ex. 1 | Ex. 2 | Ex. 3 |
| 314 | 20° | 20° | 20° |
| 316 | 70° | 70° | 70° |
| 318 | 91° | 78° | 89° |
| 320 | 70° | 98° | 84° |
| 322 | 91° | 78° | 89° |
| 324 | 70° | 98° | 84° |
| 326 | 80° | 86° | 82° |
| 328 | 80° | 86° | 82° |
| 330 | 125° | 80° | 112° |
| 332 | 40° | 40° | 40° |

Interlayer adhesion levels after orientation were measured for the films of Examples 1 and 3 and are shown as the average of five samples in Table 2.

TABLE 2

| Example Number | Interlayer Adhesion, grams/inch | |
|---|---|---|
| | PET*/*CXA | CXA/Sealant |
| 1 | (CXA E-136) 125 | CNS* |
| 3 | (CXA 3101) 73 | CNS |

*CNS = cannot separate
*/* - layer interface

While the thickness of the three layer oriented film and its layers may be selected with substantial freedom, in a typical and economical film, the overall film is about 1 mil thick; with layers 12 and 16 representing about 40% of the thickness each, and layer 14 representing about 20% of the thickness.

The film of Example 1 which was about 1 mil thick was further tested for notched tear properties in both the machine direction and the cross machine direction according to ASTM D-1922. In obtaining the cross machine direction tear properties, no unusual observations were made, and the average tear strength was 128 grams. In obtaining the with machine direction tear properties, it was observed that, after initially following the machine direction, the tear proceeded at a diagonal to the machine direction and the tear strength increased substantially. The average reported tear strength of this uniaxially machine direction oriented film, in the machine direction, was 480 grams, suprisingly more than three times the cross machine direction tear strength.

While the three layer films, such as in Examples 1, 2, and 3 may be used as is, they are preferably made into high barrier films, such as shown in FIGS. 2 and 3, by conventionally known processes of metallization, printing and extrusion lamination, or alternate processes known to the industry. Gaseous transmission rates of these barrier films are as anticipated for typical films having a metallized layer.

Figure 5:
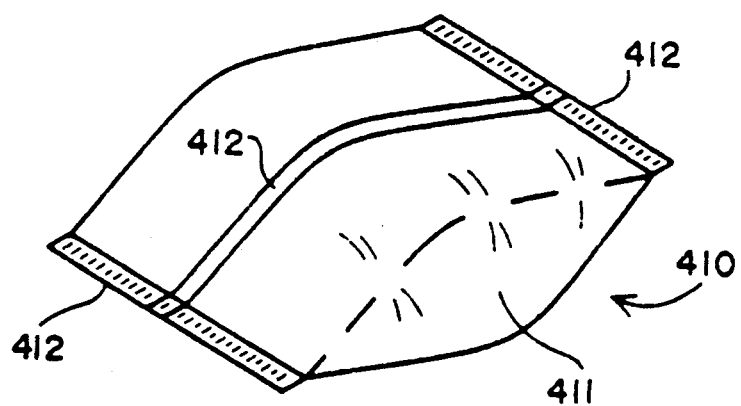
FIG. 5 is a pictorial view of a typical bag of this invention made from the films herein described.

The films of this invention are conveniently made into a bag or pouch type package as shown generally at 410 of FIG. 5 by folding portion of the completed film all over onto itself and forming heat seals 412 along a longitudinal seam and two ends. Before the final end seal 412 is made, the bag is filled with the desired amount of product.

Thus it is seen that the invention provides an economical packaging film having adjacent layers which have been simultaneously oriented, and wherein one of the simultaneously oriented layers is polyethylene terephthalate. By design, the film may have a sealant layer having a low-to-moderate heat sealing temperature. The preferred films are subsequently metallized and provided with an abuse resistant polymeric layer which protects the underlying internal layers from physical abuse. The finished film, which is readily converted into bags or pouches, has an aesthetically pleasing appearance, in the metallization; and the metallization also provides an excellent barrier to gaseous transmission.

Having thus described the invention, what is claimed is:

1. A uniaxially oriented three layer film wherein all three layers are uniaxially oriented, said film comprising, in order, a first uniaxially oriented heat sealable layer, a second uniaxially oriented layer of a modified polyolefin or olefin copolymer adhesive, and a third uniaxially oriented layer of polyethylene terephthalate, said first, second, and third layers being bonded to each other at their respective layer interfaces without the use of intervening adhesives.

2. A uniaxially oriented three layer film as in claim 1, said film having been produced by simultaneously coextruding said first, second and third layers, and subsequently simultaneously orienting all three layers.

3. A uniaxially oriented three layer film as in claim 1 wherein the composition of said heat sealable layer is chosen from the group consisting of low density polyethylene, ethylene methyl acrylate, ethylene vinyl acetate and ionomer.

4. A uniaxially oriented three layer film as in claim 1 wherein the composition of said heat sealable layer is ionomer.

5. A uniaxially oriented three layer film as in claim 2 wherein said heat sealable layer is chosen from the group consisting of low density polyethylene, ethylene methyl acrylate, ethylene vinyl acetate and ionomer.

6. A uniaxially oriented three layer film as in claim 2 wherein said heat sealable layer is ionomer.

7. A uniaxially oriented three layer film as in claim 4 wherein said adhesive layer is modified olefin copolymer.

8. A uniaxially oriented three layer film as in claim 6 wherein said adhesive layer is a modified olefin copolymer.

9. A uniaxially oriented three layer film as in claim 2 and comprising the subsequent operation of heat setting said oriented film.

10. A uniaxially oriented three layer film as in claim 9 wherein said adhesive layer is a modified olefin copolymer and wherein said sealant layer is ionomer.

11. A multiple layer film comprising, in order, a first uniaxially oriented heat sealable layer, a second uniaxially oriented layer of a modified polyolefin or olefin copolymer adhesive, a third uniaxially oriented layer of polyethylene terephthalate, a fourth metallizing layer on said polyethylene terephthalate, a fifth polyethylene adhesive layer, and a sixth abuse resistant layer, said first, second, and third layers being bonded to each other at their respective layer interfaces without the use of intervening adhesives.

12. A multiple layer film as in claim 11 wherein the composition of said first layer is chosen from the group consisting of low density polyethylene, ethylene methyl acrylate, ethylene vinyl acetate and ionomer.

13. A multiple layer film as in claim 11 wherein the composition of said first layer is ionomer.

14. A multiple layer film as in claim 13 wherein the composition of said second layer is a modified olefin copolymer.

15. A multiple layer film as in claim 14 wherein said sixth layer is oriented polypropylene.

16. A multiple layer film as in claim 15 wherein said oriented polypropylene is reverse printed with ink so that said ink is disposed in the film in locations between said fifth adhesive layer and said sixth oriented polypropylene layer.

17. A multiple layer film comprising, a first uniaxially oriented heat sealable layer, a second uniaxially oriented layer of a modified polyolefin or olefin copolymer, a third uniaxially oriented layer of polyethylene terephthalate, a fourth polyethylene adhesive layer, a fifth layer of oriented polyester and a sixth metallizing layer, said first, second, third, and fourth layers being disposed in said film in the respective recited order, said sixth layer being disposed on a selected surface of a selected one of said third and fifth layers, said selected surface being the one surface of said selected layer which is adjacent said fourth adhesive layer, said first, second and third layers being bonded to each other at their respective layer interfaces without the use of intervening adhesives.

18. A multiple layer film as in claim 17 wherein said first layer is ionomer and said second layer is a modified olefin copolymer.

* * * * *